(12) United States Patent
Henriksen

(10) Patent No.: US 6,392,072 B1
(45) Date of Patent: May 21, 2002

(54) PROCEDURE AND EQUIPMENT FOR A CHEMICAL REACTION OR MASS TRANSFER BETWEEN GAS AND LIQUID

(75) Inventor: Norolf Henriksen, Notodden (NO)

(73) Assignee: Mastrans AS, Notrodden (NO)

( * ) Notice: Subject to any disclaimer, the term of this patent is extended or adjusted under 35 U.S.C. 154(b) by 0 days.

(21) Appl. No.: 09/530,458

(22) PCT Filed: Sep. 30, 1998

(86) PCT No.: PCT/NO98/00288

§ 371 Date: Jun. 23, 2000

§ 102(e) Date: Jun. 23, 2000

(87) PCT Pub. No.: WO99/22853

PCT Pub. Date: May 14, 1999

(30) Foreign Application Priority Data

Oct. 31, 1997 (NO) ................................................ 975048

(51) Int. Cl.⁷ ........................... C07C 35/02; C07C 51/36
(52) U.S. Cl. ..................... 554/141; 261/122.1; 366/102; 366/168.1; 366/182.2; 366/307
(58) Field of Search ....................... 554/141; 261/122.1; 366/102, 168.1, 182.2, 307

(56) References Cited

U.S. PATENT DOCUMENTS 2,033,412 A    3/1936   Chapman
5,607,233 A   *   3/1997   Yant et al.

* cited by examiner

Primary Examiner—Deborah Carr
(74) Attorney, Agent, or Firm—Wenderoth, Lind & Ponack, L.L.P.

(57) ABSTRACT

Disclosed is a method and apparatus for conducting a mass transfer between a gas and a liquid, or for conducting a chemical reaction between a gas and a liquid. The method comprises supplying a liquid into a dynamic mixer, supplying a stripping gas or a reaction gas into the dynamic mixer, and flowing the liquid and the stripping gas or the reaction gas through the dynamic mixer in a turbulent co-current flow. The dynamic mixer includes a columnar casing, a rotor within the casing, which rotor has blades along substantially an entire length thereof, and stator blades positioned between the rotor blades within the casing along substantially an entire length of the casing.

21 Claims, 4 Drawing Sheets

PROCEDURE AND EQUIPMENT FOR A CHEMICAL REACTION OR MASS TRANSFER BETWEEN GAS AND LIQUID

This application is a 371 of PCT/NO98/00288 filed Sep. 30, 1998.

BACKGROUND OF THE INVENTION

The present invention concerns a method for mass transfer between gas and liquid or a chemical reaction with or without a catalyst between gas and liquid, comprising one or more process stages at each of which stripping gas or reaction gas is added. The invention is particularly well suited for use in connection with the deoxygenation of sea water which is to be injected into petroliferous formations beneath the sea bed as it is very compact and has a low weight.

Norwegian patent no. 158283 describes a system in which a circulating stripping gas, for example $N_2$, is purified catalytically before being introduced into a mass transfer unit which may be in the form of static mixers, a serpentine pipe or a tower. These prior art solutions have, until today, been considered to be both effective and compact.

SUMMARY OF THE INVENTION

However, the present invention represents a mass transfer solution which is much more effective, more compact and lighter and cheaper than the prior art solutions.

The method in accordance with the present invention is characterized by one or more process stages at each of which one or more reactors are used in the form of driven dynamic mixers and at each of which gas is added at one or more locations so that the gas and the liquid move in a turbulent co-current through each mixer.

Moreover, the equipment in accordance with the present invention is characterized by one or more process stages at each of which one or more dynamic mixers are used and gas is added at one or more locations in connection with the mixers so that the gas and the liquid pass in a turbulent co-current flow through the mixers.

The reason for the very effective mass transfer with the present invention is the design of the dynamic mixers which ensure the formation of very small gas bubbles, which produces a relatively large contact surface between the gas and the liquid and effective agitation, together with a virtual "piston current" through the mixers.

As the dynamic mixers in a multi-stage system in accordance with the present invention may be placed horizontally and above one another, the design of a multi-stage system is much simpler than that of the prior art solutions as:
- intermediate pressure pumps are eliminated,
- gas compressors can be replaced by simple blowers,
- the energy consumption is reduced,
- the volume and weight of the equipment are reduced considerably,
- the height, width and length of the installation can be selected to a greater degree, which makes the installation more flexible in terms of design.

BRIEF DESCRIPTION OF THE DRAWING

The present invention will be described in further detail in the following using examples and with reference to the attached drawings, where.

DETAILED DESCRIPTION OF THE PREFERRED EMBODIMENTS

Figure 1:
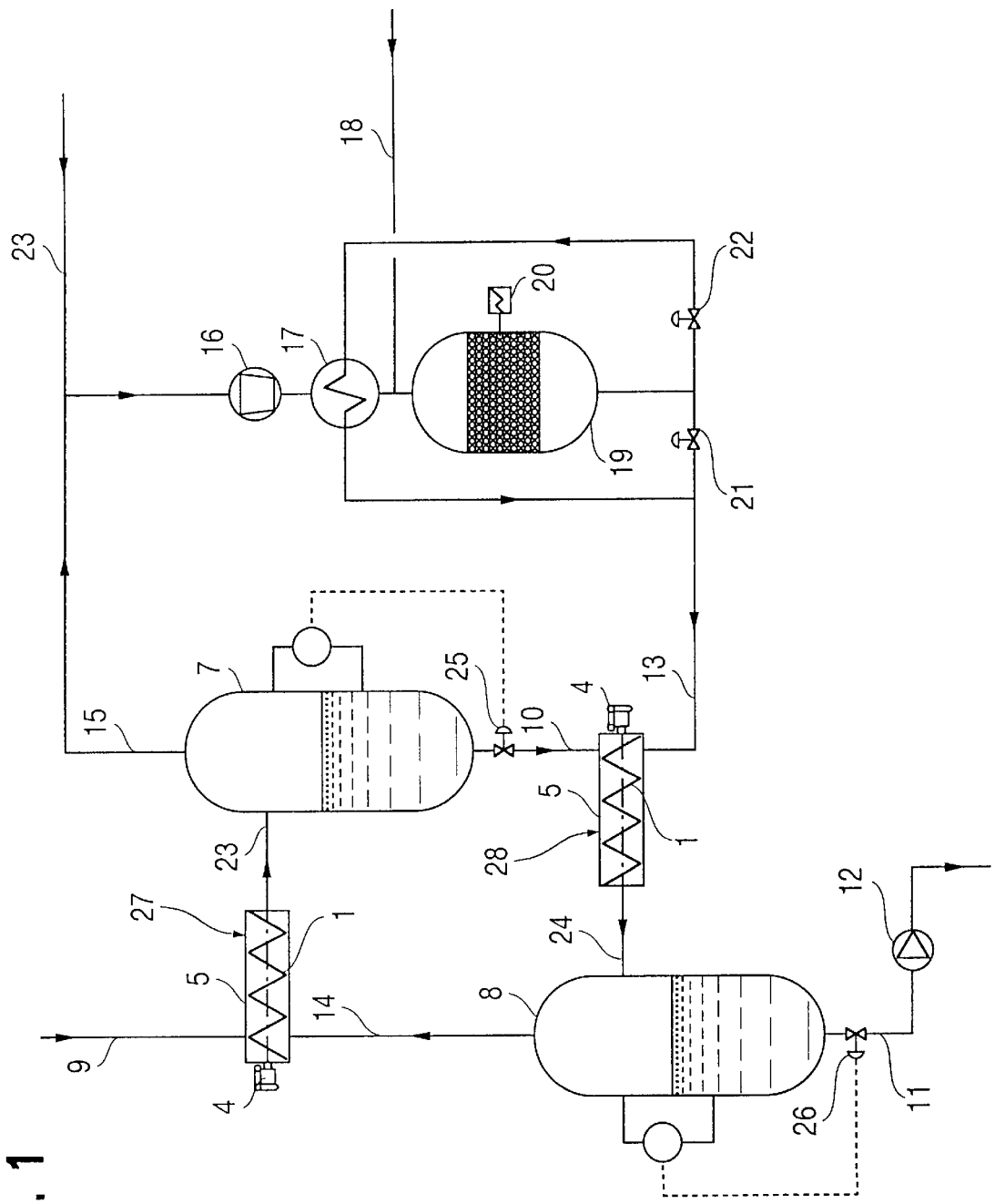
FIG. 1 shows a flow diagram for a two-stage system with circulating gas for mass transfer between gas and liquid.

As stated, FIG. 1 shows a flow diagram for a two-stage system in accordance with the present invention in which water which is to be deoxygenated is passed through a pipe 9 into a first-stage dynamic mixer 27 where stripping gas is introduced from a separator 8 through a pipe 14 and forms a turbulent co-current with the water, which flows on through a pipe 23 to a separator 7.

From the separator 7, the water flows through a level-controlled valve 25 to a second-stage dynamic mixer 28 and from there on through a pipe 24 to a second-stage separator 8.

From here, the treated water flows through a level-controlled valve 26 and a pipe 11 to a water injection pump 12.

The stripping gas is introduced to the system through a pipe 13 to the second-stage dynamic mixer 28 and passes from there to the second separator 8.

From the separator 8, the gas passes through a pipe 14 to the first-stage dynamic mixer 27 where it encounters the incoming water current and, together with this water, flows on to the separator 7 described above.

The circulation gas flows from the separator 7 through a pipe 15 to a catalytic gas purification system.

The gas purification system consists of a blower 16, a heat exchanger 17, a catalyst chamber with a heating unit 19, 20, a methanol supply 18 and temperature control valves 21, 22.

The purified stripping gas, for example N2, which is virtually free of $O_2$, is recirculated through pipe 13 back to the second-stage dynamic mixer.

Additional gas to replace the $N_2$ lost with the injection water is added either as $N_2$ or as air through a pipeline 23.

Figure 2:
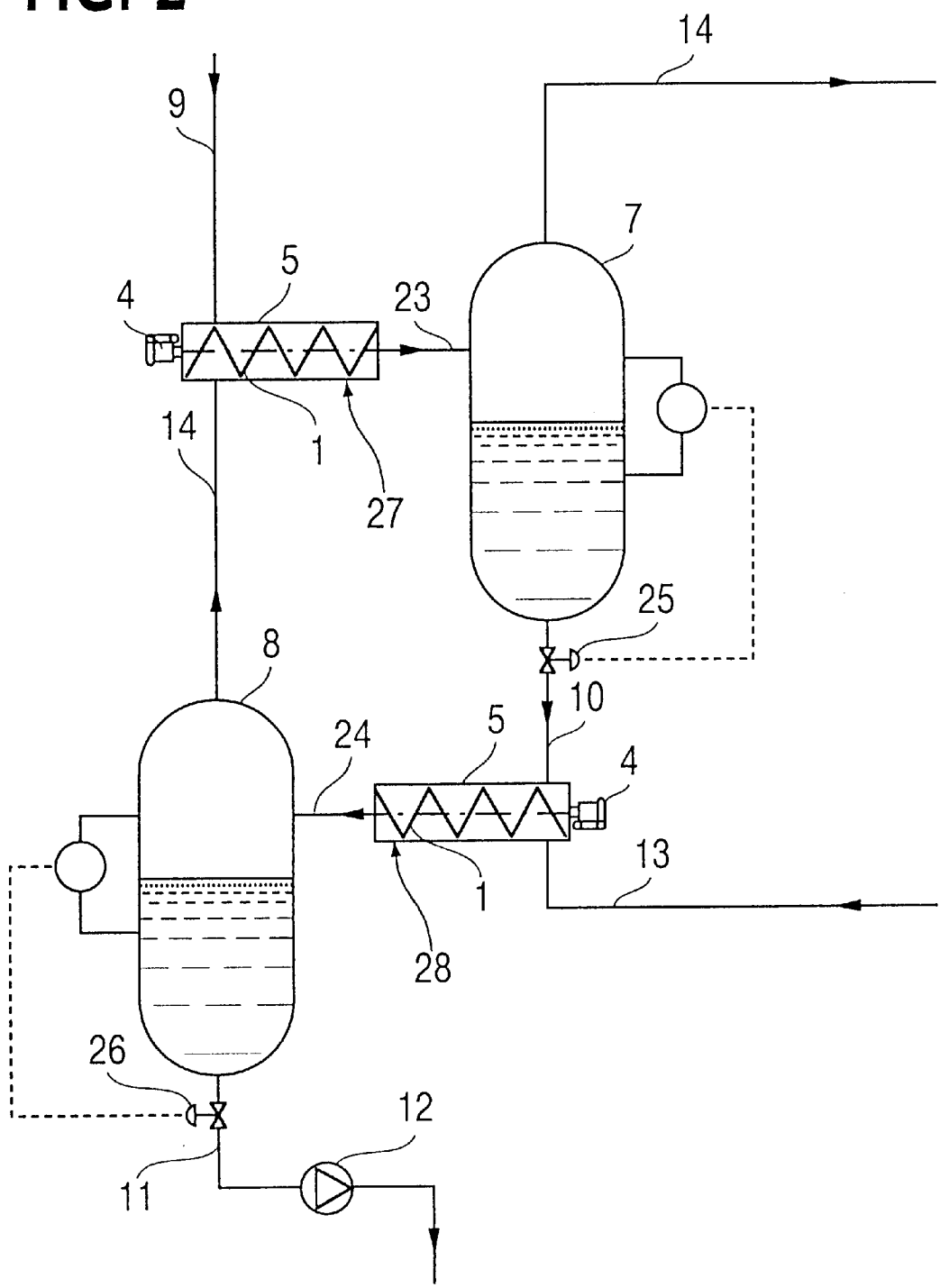
FIG. 2 shows a flow diagram for a two-stage system with fresh gas supply and integrated equipment for catalytic gas purification.

FIG. 2 shows an open system without recirculation and without a catalytic purification system integrated in the circuit.

Natural gas is used here both as the stripping gas and, if the used gas is to be purified catalytically, as the reaction gas.

The natural gas must be added as fresh gas which, after the stripping process, is removed from the system, either for combustion or consumption.

The treatment equipment for water is otherwise identical to that which is described above and shown in FIG. 1.

It is calculated that a technical system of this type with a capacity for treating water, i.e. removing $O_2$ from water, equivalent to 650 $m^3$/h will have a height, length and width of 6×5.5×2.5 m and a volume of approximately 83 $m^3$.

This represents a considerable reduction in dimensions in relation to the size of the prior art systems, which are based on static mixers, serpentine pipes or stripping towers.

Figure 3:
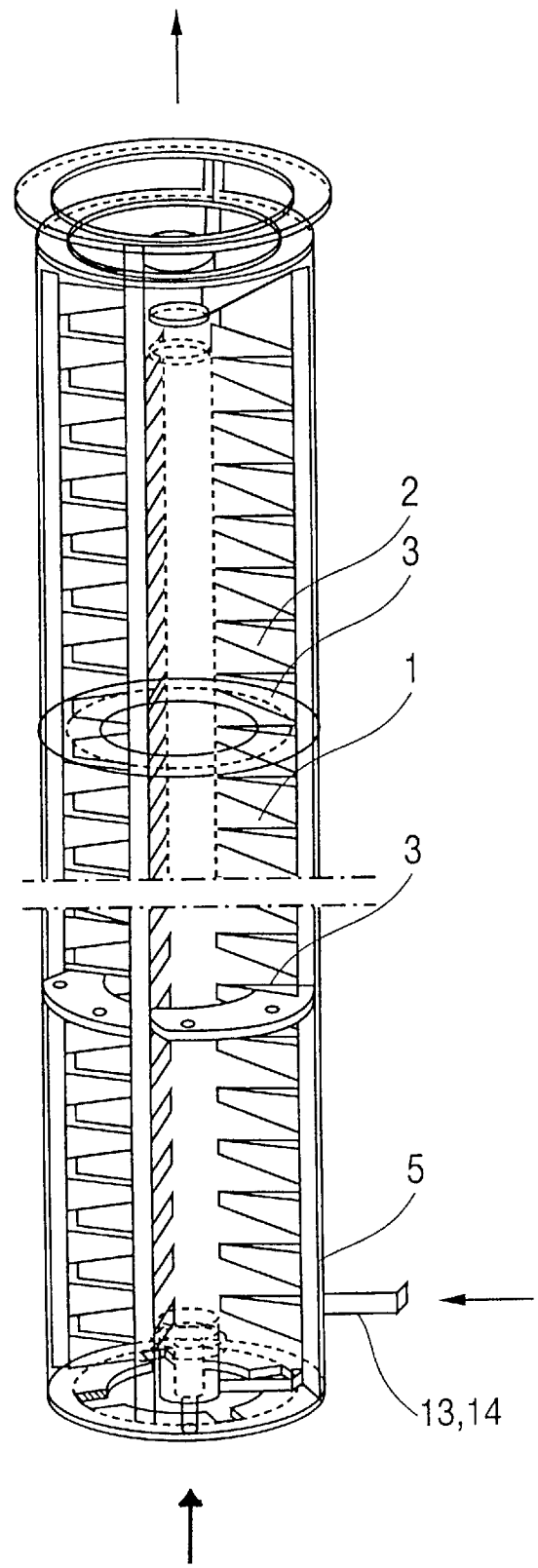
FIG. 3 shows a drawing of a dynamic mixer in accordance with the present invention.

FIG. 3 shows an example of a dynamic mixer 27, 28 in accordance with the present invention. It consists of an external cylindrical casing 5 with internal guide vanes 2 and a rotor with rotor vanes 1 which are designed to be driven by a motor 4 (see FIGS. 1 and 2). Liquid flows into the mixer at the lower end and out through the other (upper) end (not shown). Gas is added through an inlet 13, 14 in the side of the casing near the water inlet.

By means of the rotation of the rotor with the rotor vanes 1 and the "cutting" of the liquid/gas current against the guide vanes, very good splitting and distribution of gas bubbles in the liquid are achieved. The advantages of such a dynamic mixer over a static mixer are manifold:

- it has a wider working area, i.e. the quantity of liquid and gas and the ratio between them can be varied almost without limitation,
- the intensity of the turbulence in the liquid flowing through can be adjusted freely by varying the RPM of the rotor,
- the pressure drop through a dynamic mixer can be eliminated by means of an added agitation effect while it is relatively high through a static mixer.

Moreover, calculations show that the total investment costs will be lower for a solution with dynamic mixers as described in the present application than for conventional systems with, for example, static mixers.

Example:

A pilot system was tested with a view to removing $O_2$ from crude water. The test setup had the following data:

Number of stages:

Two dynamic mixers with a diameter of 190 mm, length of 2000 mm, and rotor speed of 300 RPM.

| Capacity: | |
| --- | --- |
| Operating pressure | Atmospheric |
| Circulating quantity of $N_2$ | 55 Nm³/h |
| Reaction gas for catalytic $N_2$ purification | $H_2$ |
| $O_2$ content in crude water | 9 ppm |

After the first stage, the $O_2$ content was reduced to 280 ppb. Moreover, after the second stage the $O_2$ content was reduced to 10 ppb, which is lower than the normal operating requirement of 20 ppb.

The present invention is not limited to mass transfer. It may also be used for a chemical reaction between gas and liquid with or without the use of a catalyst.

Figure 4:
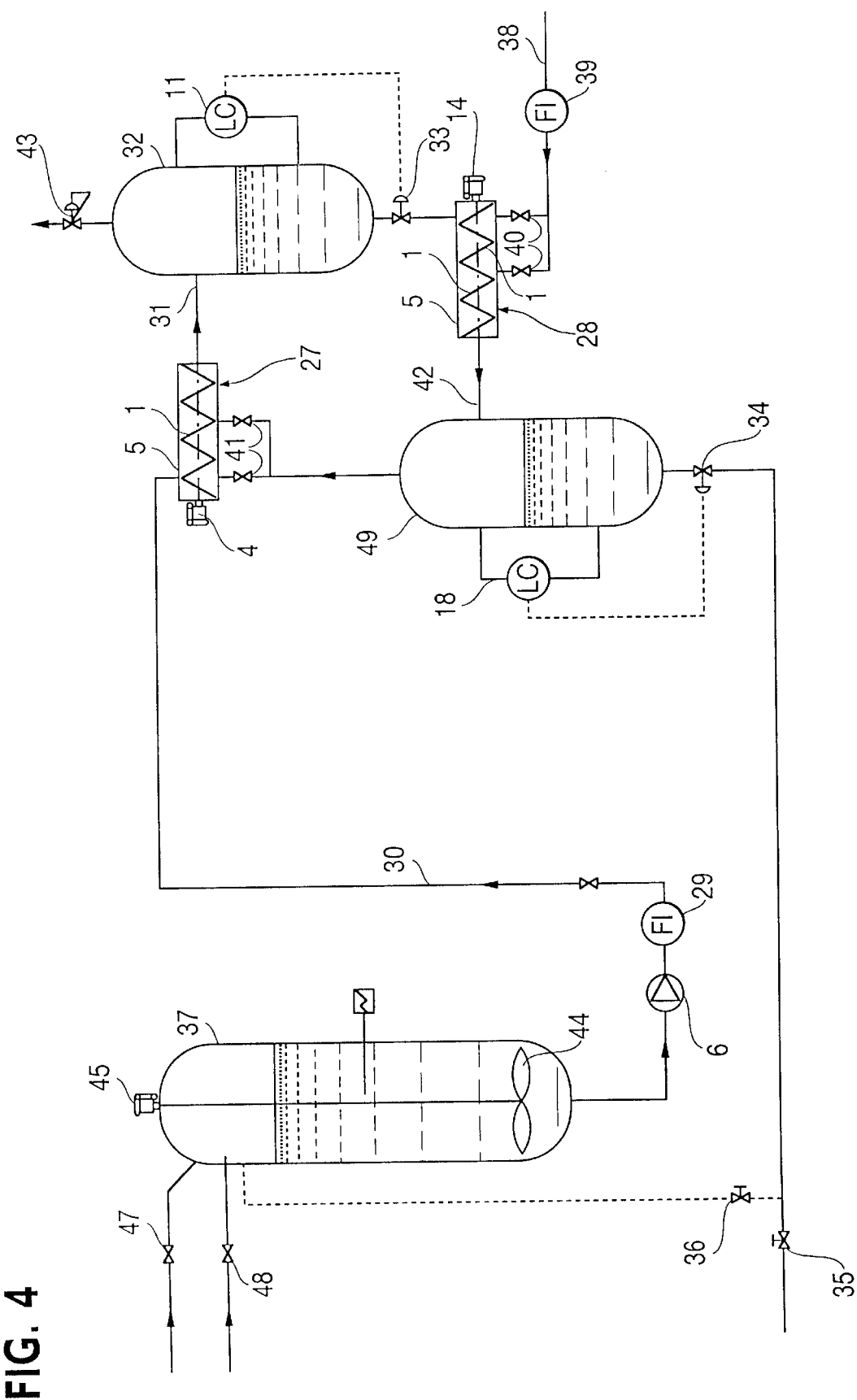
FIG. 4 shows a two-stage flow diagram for a chemical reaction between gas and liquid, more precisely by means of hydrogenation or hardening of oil, fat or fatty acids.

Thus FIG. 4 shows a flow diagram for a chemical reaction between gas and liquid, more precisely a system for hydrogenating or hardening oil, fat or fatty acids.

The liquid, oil or similar substance, which is to be treated is pumped, using pump 6, through a quantity meter 29 and a pipe 30 to a first-stage dynamic mixer 27 with an operating motor 4 and a rotor 1 and from there, together with the gas, through a pipe 31 to a separator 32 and from there through a level-controlled valve 33 to a second-stage dynamic mixer 28 and from there, together with the gas, through a pipe 42 to a separator 49.

From the separator 49, the treated liquid flows through a level-controlled valve 34 and pipes with a stop valve 35 out of the system. The liquid may be recirculated back to the feed tank 37 through pipes and a stop valve 36. The gas used in the process, $H_2$ or a mixture of $H_2$ and other gases, passes through a pipe 38, a quantity meter 39 and valves 40 into the second-stage mixer 28 from where unreacted gas (together with the liquid) flows through the pipe 42 into the separator 49.

From the separator 49, the gas passes through a valve 41 to a first-stage mixer 27 and from there (together with the liquid) through pipe 31 into the separator 32.

From the separator 32, any unreacted gas flows through a valve 43 and out for reuse.

The system shown in FIG. 4 is of the continuous type with a feed tank 37. This is provided with an agitator 44 which is driven by a motor 45. Untreated liquid and a catalyst are added through pipes with stop valves 47, 48.

The system may, instead of catalyst dispensed in liquid form, also be used with solid, fixed catalysts. In such a case, it will be expedient to arrange these catalysts in connection with the rotor and stator blades in the dynamic mixers. The latter mixers are, moreover, of the same type as stated above and shown in FIG. 3.

Unlike all prior art reactors, the present system may be built as a multi-stage system with a counter-current between the gas and liquid from stage to stage and with a co-current in the individual stages. This provides great process-related advantages when the hydrogenation is to be taken so far that the oil is fully saturated with hydrogen in that there will be a large surplus of hydrogen in the last stage in relation to the unsaturated oil molecules.

With the present system with dynamic mixers, it is possible to achieve a reaction speed, calculated as the reduction in iodine value per m³ per hour, which is 20 times as high as that of a conventional batch hydrogenation reactor, and the energy consumption is only ⅓ as high.

Another advantage is that the process can be controlled much better with regard to temperature, hydrogenation speed, etc. and the investment costs are lower.

Example

A test was performed with hydrogenation of oil in a 1-stage pilot system in which the circulating quantity of oil was 300 litres per hour, the operating temperature in the mixers was between 180–195° C., the operating pressure was 5.5 bar and the dispersed quantity of catalyst was approximately 0.5%.

The performance figures, PR, which were measured were PR=340 for iodine values between 132 and 80 and PR=114 for iodine values between 60 and 45. The performance figures specify the reduction in iodine value per hour per m³ reactor volume.

Compared with a conventional reactor, these are very high performance figures.

What is claimed is:

1. A method for conducting a mass transfer between a gas and a liquid, or for conducting a chemical reaction between a gas and a liquid either with or without a catalyst, said method comprising:
   - supplying a liquid into a first dynamic mixer;
   - supplying a stripping gas or a reaction gas into said first dynamic mixer; and
   - flowing said liquid and said stripping gas or said reaction gas through said first dynamic mixer in a turbulent co-current flow such that said turbulent co-current flow exits from an axial end of said first dynamic mixer in a generally axial direction.

2. The method according to claim 1, further comprising:
   - flowing said co-current flow into a first gas/liquid separator to separate said stripping gas or said reaction gas as a surplus gas from said liquid;
   - flowing said liquid from said first gas/liquid separator to a second dynamic mixer;
   - flowing said surplus gas from said first gas/liquid separator to said second dynamic mixer; and
   - flowing said liquid and said surplus gas through said second dynamic mixer in a turbulent co-current flow such that said co-current flow exits from an axial end of said second dynamic mixer in a generally axial direction.

3. The method according to claim 2, further comprising;
   after flowing said liquid and said surplus gas though said second dynamic mixer, performing one of (i) exhausting any additional surplus gas to an external environment, and (ii) recirculating and purifying any additional surplus gas.

4. The method according to claim 3, wherein supplying the liquid into the first dynamic mixer comprises pumping said liquid from a feed tank into said first dynamic mixer, said method further comprising:

pumping said liquid that has flowed through said second dynamic mixer into a receiver tank.

5. The method according to claim 3, wherein supplying the liquid into the first dynamic mixer comprises pumping said liquid from a bottom of a feed tank into said first dynamic mixer, said method further comprising:

pumping said liquid that has flowed through said second dynamic mixer to a top of said feed tank.

6. The method according to claim 1, wherein supplying the liquid into the first dynamic mixer comprises pumping said liquid from a feed tank into said first dynamic mixer, said method further comprising:

pumping said liquid that has flowed through said first dynamic mixer into a receiver tank.

7. The method according to claim 1, wherein supplying the liquid into the first dynamic mixer comprises pumping said liquid from a bottom of a feed tank into said first dynamic mixer, said method further comprising:

pumping said liquid that has flowed through said first dynamic mixer to a top of said feed tank.

8. A method for conducting a mass transfer between a gas and a liquid, or for conducting a chemical reaction between a gas and a liquid either with or without a catalyst, said method comprising:

supplying a liquid into a first dynamic mixer that includes
(i) a columnar casing,
(ii) a rotor within said columnar casing, said rotor having rotor blades along substantially an entire length of said rotor, and
(iii) stator blades positioned between said rotor blades within said columnar casing along substantially an entire length of said columnar casing;

supplying a stripping gas or a reaction gas into said first dynamic mixer; and flowing said liquid and said stripping gas or said reaction gas through said first dynamic mixer in a turbulent co-current flow.

9. The method according to claim 8, further comprising:

flowing said co-current flow into a first gas/liquid separator to separate said stripping gas or said reaction gas as a surplus gas from said liquid;

flowing said liquid from said first gas/liquid separator to a second dynamic mixer;

flowing said surplus gas from said first gas/liquid separator to said second dynamic mixer; and flowing said liquid and said surplus gas through said second dynamic mixer in a turbulent co-current flow.

10. The method according to claim 9, further comprising; one/of after flowing said liquid and said surplus gas though said second dynamic mixer, performing one of (i) exhausting any additional surplus gas to an external environment, and (ii) recirculating and purifying any additional surplus gas.

11. The method according to claim 10, wherein supplying the liquid into the first dynamic mixer comprises pumping said liquid from a feed tank into said first dynamic mixer, said method further comprising:

pumping said liquid that has flowed through said second dynamic mixer into a receiver tank.

12. The method according to claim 10, wherein supplying the liquid into the first dynamic mixer comprises pumping said liquid from a bottom of a feed tank into said first dynamic mixer, said method further comprising:

pumping said liquid that has flowed through said second dynamic mixer to a top of said feed tank.

13. The method according to claim 8, wherein supplying the liquid into the first dynamic mixer comprises pumping said liquid from a feed tank into said first dynamic mixer, said method further comprising:

pumping said liquid that has flowed through said first dynamic mixer into a receiver tank.

14. The method according to claim 8, wherein supplying the liquid into the first dynamic mixer comprises pumping said liquid from a bottom of a feed tank into said first dynamic mixer, said method further comprising:

pumping said liquid that has flowed through said first dynamic mixer to a top of said feed tank.

15. The method according to claim 8, wherein said columnar casing is tubular.

16. An apparatus for conducting a mass transfer between a gas and a liquid, or for conducting a chemical reaction between a gas and a liquid, said apparatus comprising:

a dynamic mixer including
(i) a columnar casing;
(ii) a rotor within said columnar casing, said rotor having rotor blades along substantially an entire length of said rotor; and
(iii) stator blades positioned between said rotor blades within said columnar casing along substantially an entire length of said columnar casing.

17. The apparatus according to claim 16, wherein said dynamic mixer further includes at least one partition within said columnar casing that divides an interior of said columnar casing into at least two chambers.

18. The apparatus according to claim 16, wherein said dynamic mixer is to receive a liquid and a stripping gas or a reaction gas such that the liquid and the stripping gas or the reaction gas flows through said columnar casing in a turbulent co-current flow, and further comprising a gas/liquid separator to receive the co-current flow from said dynamic mixer.

19. The apparatus according to claim 18, further comprising another dynamic mixer to receive the liquid from said gas/liquid separator and to receive a stripping gas or a reaction gas, wherein said another dynamic mixer includes (i) a columnar casing;
(ii) a rotor within said columnar casing, said rotor having rotor blades along substantially an entire length of said rotor; and
(iii) stator blades positioned between said rotor blades within said columnar casing along substantially an entire length of said columnar casing.

20. The apparatus according to claim 19, wherein said another dynamic mixer is to receive the liquid from said gas/liquid separator and the stripping gas or the reaction gas such that the liquid and the stripping gas or the reaction gas flow through said columnar casing of said another dynamic separator in a turbulent co-current flow, and further comprising another gas/liquid separator to receive the co-current flow from said another dynamic mixer.

21. The apparatus according to claim 20, wherein at least one of said dynamic mixer and said another dynamic mixer further includes at least one partition within a respective said columnar casing that divides an interior of said respective said columnar casing into at least two chambers.

\* \* \* \* \*